(12) United States Patent
Park et al.

(10) Patent No.: US 12,191,489 B2
(45) Date of Patent: Jan. 7, 2025

(54) NEGATIVE ACTIVE MATERIAL FOR RECHARGEABLE LITHIUM BATTERY AND RECHARGEABLE LITHIUM BATTERY INCLUDING SAME

(71) Applicant: Samsung SDI Co., Ltd., Yongin-si (KR)

(72) Inventors: Sunil Park, Yongin-si (KR); Narae Kim, Yongin-si (KR); Jaehou Nah, Yongin-si (KR); Joongho Moon, Yongin-si (KR); Hyun Soh, Yongin-si (KR); Eunjoo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 58 days.

(21) Appl. No.: 17/190,863

(22) Filed: Mar. 3, 2021

(65) Prior Publication Data
US 2021/0280868 A1    Sep. 9, 2021

(30) Foreign Application Priority Data

Mar. 3, 2020    (KR) .................. 10-2020-0026660

(51) Int. Cl.
*H01M 4/583*     (2010.01)
*H01M 4/02*      (2006.01)
(Continued)

(52) U.S. Cl.
CPC ......... *H01M 4/583* (2013.01); *H01M 4/0471* (2013.01); *H01M 10/0525* (2013.01);
(Continued)

(58) Field of Classification Search
CPC ............... H01M 4/583; H01M 4/0471; H01M 10/0525; H01M 10/44; H01M 2004/021; H01M 2004/027
See application file for complete search history.

(56) References Cited

U.S. PATENT DOCUMENTS 5,419,883 A    5/1995    Ogawa et al.
6,139,990 A    10/2000   Kubota et al.
(Continued)

FOREIGN PATENT DOCUMENTS

CN    1237003 A    12/1999
CN    1497764 A    5/2004
(Continued)

OTHER PUBLICATIONS

EPO Extended European Search Report dated Jan. 24, 2020 for EP Application No. 19195631.7, 10 pages.
(Continued)

*Primary Examiner* — Brian R Ohara
*Assistant Examiner* — Patrick Marshall Greene
(74) *Attorney, Agent, or Firm* — Lewis Roca Rothgerber Christie LLP (57) ABSTRACT

A negative active material for a rechargeable lithium battery includes a secondary particle in which a plurality of natural graphite primary particles are agglomerated, the plurality of primary particles including natural graphite, and the secondary particle including pores, and an amorphous carbon positioned in the pores, wherein an area of the amorphous carbon is about 10% to about 30% based on a total area of 100% of the negative active material, in a cross-section of the negative active material.

7 Claims, 2 Drawing Sheets

(51) Int. Cl.
*H01M 4/04* (2006.01)
*H01M 10/0525* (2010.01)
*H01M 10/44* (2006.01)

(52) U.S. Cl.
CPC ...... *H01M 10/44* (2013.01); *H01M 2004/021* (2013.01); *H01M 2004/027* (2013.01)

(56) References Cited

U.S. PATENT DOCUMENTS

| | | | |
|---|---|---|---|
| 6,482,547 | B1 | 11/2002 | Yoon et al. |
| 2002/0197534 | A1 | 12/2002 | Fukuda et al. |
| 2004/0062993 | A1 | 4/2004 | Yanagida et al. |
| 2004/0137328 | A1 | 7/2004 | Kim et al. |
| 2005/0266314 | A1 | 12/2005 | Sheem et al. |
| 2006/0062717 | A1 | 3/2006 | Tokuoka et al. |
| 2010/0273058 | A1* | 10/2010 | Lee .................. H01M 4/587 252/182.1 |
| 2010/0285359 | A1 | 11/2010 | Hwang et al. |
| 2011/0195313 | A1 | 8/2011 | Lee et al. |
| 2011/0281180 | A1 | 11/2011 | Kim et al. |
| 2013/0309578 | A1 | 11/2013 | Umeno et al. |
| 2014/0057166 | A1 | 2/2014 | Yokoyama et al. |
| 2014/0178762 | A1 | 6/2014 | Lee et al. |
| 2015/0180019 | A1 | 6/2015 | Lee et al. |
| 2015/0318545 | A1 | 11/2015 | Satow et al. |
| 2015/0349332 | A1* | 12/2015 | Azami .................. H01M 10/058 429/188 |
| 2015/0349335 | A1 | 12/2015 | Won et al. |
| 2017/0062823 | A1 | 3/2017 | Yamaguchi et al. |
| 2017/0162869 | A1 | 6/2017 | Shim et al. |
| 2017/0187041 | A1 | 6/2017 | Yamada et al. |
| 2017/0352868 | A1 | 12/2017 | Zhamu et al. |
| 2017/0352871 | A1 | 12/2017 | Kim et al. |
| 2019/0198863 | A1 | 6/2019 | Lee |
| 2019/0229325 | A1 | 7/2019 | Ahn et al. |
| 2019/0355971 | A1 | 11/2019 | Kim |
| 2020/0083536 | A1 | 3/2020 | Lee et al. |
| 2020/0148545 | A1 | 5/2020 | Spahr et al. |
| 2020/0185720 | A1 | 6/2020 | Lee et al. |

FOREIGN PATENT DOCUMENTS

| | | | |
|---|---|---|---|
| CN | 1516305 | A | 7/2004 |
| CN | 1848489 | A | 10/2006 |
| CN | 102244251 | A | 11/2011 |
| CN | 103492316 | A | 1/2014 |
| CN | 103560233 | A | 2/2014 |
| CN | 104716383 | A | 6/2015 |
| CN | 105280891 | A | 1/2016 |
| CN | 106486671 | A | 3/2017 |
| CN | 106663808 | A | 5/2017 |
| JP | 7-300313 | A | 11/1995 |
| JP | 10-312806 | A | 11/1998 |
| JP | 11-263612 | A | 9/1999 |
| JP | 2001-283844 | A | 10/2001 |
| JP | 2002-367611 | A | 12/2002 |
| JP | 2012-216521 | A | 11/2012 |
| JP | 2012-216537 | A | 11/2012 |
| JP | 2013-201125 | A | 10/2013 |
| JP | WO2014/103281 | A1 | 7/2014 |
| JP | 2015-153664 | A | 8/2015 |
| JP | 2015-228370 | A | 12/2015 |
| JP | 2016-184581 | A | 10/2016 |
| JP | 2017-45574 | A | 3/2017 |
| JP | 2020-43069 | A | 3/2020 |
| KR | 10-2006-0051305 | A | 5/2006 |
| KR | 10-2014-0099988 | A | 8/2014 |
| KR | 10-2017-0002171 | A | 1/2017 |
| KR | 10-2017-0016710 | A | 2/2017 |
| KR | 10-2017-0065238 | A | 6/2017 |
| KR | 10-2017-0136878 | A | 12/2017 |
| KR | 10-2018-0022489 | A | 3/2018 |
| KR | 10-1965773 | B1 | 4/2019 |
| KR | 10-2019-0101179 | A | 8/2019 |
| WO | WO 2010/041907 | A2 | 4/2010 |
| WO | WO 2012/077653 | A1 | 6/2012 |
| WO | WO 2014/024473 | A1 | 2/2014 |
| WO | WO 2014-103281 | A1 | 7/2014 |
| WO | WO 2018/012821 | A1 | 1/2018 |
| WO | 2019/016395 | A1 | 1/2019 |

OTHER PUBLICATIONS

EPO Office Action dated Nov. 12, 2020 for EP Application No. 19195631.7, 5 pages.
JPO Office action in JP Application No. 2019-163130 dated Aug. 31, 2020, 4 pages (Japanese only).
Gong Jinbao, et al., "Study on Carbon Materials for Anodes of Lithium-Ion Batteries," Journal of Fudan University (Natural Science), vol. 43, No. 4, Aug. 2004, 7 pages.
Chinese Office Action dated Dec. 1, 2021, issued in Chinese Patent Application No. 201910841285.4 (10 pages).
U.S. Notice of Allowance dated Dec. 1, 2021, issued in U.S. Appl. No. 16/560,522 (9 pages).
EPO Extended European Search Report dated Jul. 29, 2021, issued in European Patent Application No. 21160330.3 (9 pages).
EPO Extended European Search Report dated Jul. 30, 2021, issued in corresponding European Patent Application No. 21160335.2 (10 pages).
Chinese Office Action, with English translation, dated Jun. 17, 2022, issued in Chinese Patent Application No. 201910841285.4 (19 pages).
Korean Office Action dated Jan. 29, 2021, issued in Korean Patent Application No. 10-2018-0106955 (5 pages).
U.S. Office Action dated Jun. 24, 2021, issued in U.S. Appl. No. 16/560,522 (9 pages).
Japanese Office Action, with English translation, dated Sep. 5, 2022, issued in Japanese Patent Application No. 2021-147834 (13 pages).
JS Notice of Allowance dated Sep. 16, 2022, issued in U.S. Appl. No. 17/190,802 (8 pages).
US Notice of Allowance dated Dec. 21, 2022, issued in U.S. Appl. No. 17/190,802 (5 pages).
Chinese Notice of Allowance for CN Application No. 202110234539.3 dated Jan. 4, 2024, 9 pages.
Chinese Office Action for CN Application No. 202110234460.0 dated Jan. 3, 2024, 12 pages.
Japanese Office Action for JP Application No. 2023-127171, dated Nov. 5, 2024, 5 pages.

* cited by examiner

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2020-0026660, filed in the Korean Intellectual Property Office on Mar. 3, 2020, the entire content of which is incorporated herein by reference. This application includes subject matter related to co-pending and commonly owned application Ser. No. 17/190,802 filed on the same date as this application, and to co-pending and commonly owned U.S. application Ser. No. 16/560,522 filed on Sep. 4, 2019, the entire content of each of which is incorporated herein by reference.

BACKGROUND

1. Field

One or more aspects of embodiments of the present disclosure relate to a negative active material for a rechargeable lithium battery and a rechargeable lithium battery including the same.

2. Description of the Related Art

Technologies for high capacity rechargeable lithium batteries are being continuously developed due to increasing demand on mobile equipment and/or portable batteries.

As for a positive active material of a rechargeable lithium battery, a lithium-transition metal oxide having a structure capable of intercalating lithium ions (such as $LiCoO_2$, $LiMn_2O_4$, $LiNi_{1-x}Co_xO_2$ (0<x<1), and/or the like) has been utilized.

As for a negative active material capable of intercalating and deintercalating lithium ions, Si-based active materials including Si and Sn, or various suitable carbon-based materials including artificial graphite, natural graphite, and/or hard carbon have been utilized.

The information disclosed in this Background section is provided only to enhance understanding of the background of the present disclosure, and may not constitute prior art.

SUMMARY

One or more aspects of embodiments of the present disclosure are directed toward a negative active material for a rechargeable lithium battery exhibiting good safety and/or excellent cycle-life characteristics.

One or more aspects of embodiments of the present disclosure are directed toward a method of preparing the negative active material.

One or more aspects of embodiments of the present disclosure are directed toward a rechargeable lithium battery including the negative active material.

One or more embodiments of the present disclosure provide a negative active material including a secondary particle in which a plurality of primary particles are agglomerated, the plurality of primary particles including natural graphite, and the secondary particle including pores and amorphous carbon positioned in the pores, wherein an area of the amorphous carbon is about 10% to about 30% based on a total area of 100%, of the negative active material, in a cross-section of the negative active material.

Each primary particle of the plurality of primary particles may have a particle diameter of about 5 μm to about 15 μm.

The secondary particle may have a particle diameter of about 8 μm to about 24 μm.

The natural graphite may be flake graphite.

The natural graphite may be flake graphite having a long axis and a short axis, and a length of the long axis may be about 5 μm to about 15 μm.

The secondary particle may further include amorphous carbon on a surface (e.g., outer surface) of the secondary particle.

The negative active material may include the amorphous carbon in an amount of about 1 wt % to about 9 wt % based on a total weight of 100 wt % of the negative active material.

One or more embodiments of the present disclosure provide a method of preparing a negative active material, including: mixing an amorphous carbon precursor with a secondary particle including agglomerated natural graphite primary particles and pores to prepare a mixture; controlling a pressure of the mixture; maintaining the resulting product at a temperature at which a viscosity of the amorphous carbon precursor is about 100 cP to about 1000 cP; disintegrating the obtained material; and heat-treating the resulting material.

The amorphous carbon precursor may have a softening point of about 200° C. to about 300° C.

The temperature at which a viscosity of the amorphous carbon precursor is about 100 cP to about 1000 cP may be about 350° C. to about 400° C.

The heat treatment may be performed at about 950° C. to about 1400° C.

The controlling of the pressure of the mixture may be performed utilizing a pressing procedure by exerting a pressure of about 10 MPa to about 100 MPa, or utilizing a decompressing procedure by reducing with a pressure of about −0.1 MPa to about −1.0 MPa. According to one embodiment, the controlling of the pressure may be or include a pressing procedure, for example exerting a pressure on the mixture.

The method may further include sieving the resulting product after the controlling of the pressure, and before the maintaining of the resulting product at the temperature.

One or more embodiments of the present disclosure provide a rechargeable lithium battery including a negative electrode including the negative active material; a positive electrode including a positive active material; and an electrolyte between the negative electrode and the positive electrode.

The negative active material for a rechargeable lithium battery may exhibit excellent charge rate and/or discharge rate characteristics.

DETAILED DESCRIPTION

Hereinafter, embodiments are described in more detail.

However, these embodiments are examples, and the present disclosure is not limited thereto and is defined by the scope of the following claims and equivalents thereof.

As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, steps, operations, elements, and/or components, but do not preclude the presence or addition of one or more other features, steps, operations, elements, components, and/or groups thereof.

As used herein, expressions such as "at least one of," "one of," and "selected from," when preceding a list of elements, modify the entire list of elements and do not modify the individual elements of the list. As used herein, the term "and/or" includes any and all combinations of one or more of the associated listed items. Further, the use of "may" when describing embodiments of the present disclosure refers to "one or more embodiments of the present disclosure".

It will be understood that when an element is referred to as being "on," "connected to," or "coupled to" another element, it may be directly on, connected, or coupled to the other element or one or more intervening elements may also be present. When an element is referred to as being "directly on," "directly connected to," or "directly coupled to" another element, there are no intervening elements present.

A negative active material for a rechargeable lithium battery according to one embodiment includes a secondary particle in which a plurality of primary particles are agglomerated, the plurality of primary particles including (e.g., being) natural graphite, and the secondary particle including pores, and an amorphous carbon positioned in the pores. Herein, the area of the amorphous carbon is about 10% to about 30% based on a total area of 100%, of the negative active material, in the cross-section (e.g., a cross-section, for example the cross-section through a center diameter) of the negative active material for the rechargeable lithium battery.

In one embodiment, the area may be an area from the cross-section of the negative active material for the rechargeable lithium battery. For example, in a SEM image of a polished cross-section (CP) of the negative active material, the dark region with a low value may be classified (e.g., identified) as amorphous carbon, and the bright region with a high value may be classified (e.g., identified) as graphite. The area of each region and the total area of the negative active material may be measured by utilizing the Image J analysis tool, or may be measured utilizing any suitable equipment or procedure in the related art.

As such, the negative active material according to one embodiment includes amorphous carbon positioned in the pores of the secondary particle, and for example is an active material in which the amorphous carbon is filled in pores that are formed when the secondary particle is prepared by agglomerating the primary particles. Furthermore, the secondary particle may have a cabbage shape that is formed by randomly building up and agglomerating at least one natural graphite primary particle, and may include pores inside (e.g., may have internal pores). For example, at least one primary particle is agglomerated and layered with random offsets around a cylindrical or hemispherical volume as in the shape of leaves in a cabbage bulb.

A degree of filling the amorphous carbon (e.g., the degree to which the amorphous carbon fills the pores) may be obtained from (e.g., by measuring) an area of the amorphous carbon in the negative active material, and when the area of the amorphous carbon is about 10% to about 30% based on a total area of 100%, of the negative active material, the internal density of the negative active material may be improved, and/or the expansion of the active material during charge and discharge may be effectively suppressed. Furthermore, when the amorphous carbon is sufficiently filled in the pores to allow minimization or reduction of empty space in the pores in the active material, side reaction(s) between the active material and the electrolyte that occur when electrolyte is impregnated into the pores of the active material may be effectively suppressed or reduced, so that the cycle-life characteristics may be improved.

When the area of the amorphous carbon is less than 10% based on a total area of 100% of the negative active material, the amount of amorphous carbon positioned in the pores is too small, resultantly reducing the internal density, so that expansion of the active material expansion may not be suppressed, and impregnation of electrolyte into the pores may occur, thereby obtaining no effects for suppressing side reaction(s) with the electrolyte or improving the cycle-life characteristics.

When the area of the amorphous carbon is larger than 30% based on a total area of 100% of the negative active material, the negative active material may be excessively filled in the pores of the negative active material, such that the efficiency of the battery for practical use may not be satisfied and/or shortcomings related to high-temperature storage characteristics may occur.

The flake natural graphite generally includes (e.g., consists of) huge particles of about 80 μm, and if the agglomeration is performed utilizing such huge particles, many pores may be formed within the particle, which may promote side reaction(s) with the electrolyte and deterioration of the cycle-life characteristics due to electrode expansion during charge and discharge, and primary particles with large particle diameters may be prepared, which is not desired or suitable.

In contrast, the negative active material according to an embodiment includes primary particles having a particle diameter of about 5 μm to about 15 μm, and secondary particles in which the primary particles are agglomerated, such that the occurrence of internal pores may be slightly reduced. Furthermore, the amorphous carbon may be positioned in the internal pores to fill the internal pores, so that the effects of slightly decreased inner pore formation by utilizing the fine primary particles and by filing the amorphous carbon in the inner pores may both be obtained (e.g., simultaneously), and the material density may be improved.

The primary particles may each have a particle diameter of about 5 μm to about 15 μm, e.g., about 5 μm to about 13 μm, about 5 μm to about 12 μm, or about 5.5 μm to about 11.5 μm. The secondary particle may have a particle diameter of about 8 μm to about 24 μm, e.g., about 10 μm to about 24 μm, about 11 μm to about 24 μm, about 12 μm to about 24 μm, about 13 μm to about 24 μm, about 13 μm to about 23 μm, or about 13 μm to about 20 μm.

When the particle diameters of the primary particles and the secondary particle are within the above ranges, the expansion of the negative active material including them may be effectively suppressed or reduced, and the tap density of the negative active material may be further increased. In some embodiments, there may be an advantage of excellent power characteristics at a high charge or discharge rate.

The particle diameters of the primary and the secondary particles may each be expressed as an average particle diameter. Herein, the term "average particle diameter" refers to a value obtained from measuring and adding a plurality of particles to a particle size analyzer, and may, in particular, refer to a particle diameter (D50) at cumulative 50 volume % in a cumulative size-distribution curve of the particles. For example, unless otherwise defined, the term "average particle diameter (D50)" refers to a diameter of particles having a volume of 50% in the cumulative particle size distribution.

The average particle size D50 may be measured by any suitable technique in the art, for example, by utilizing a particle size analyzer, transmission electron microscope (TEM) photography, or scanning electron microscope (SEM) photography. Another method involves utilizing dynamic light scattering to count a number of particles relative to each particle size, and then calculating an average particle diameter D50 from the data.

The number of primary particle constituting the secondary particle (e.g., the core) is not particularly limited as long as they form a secondary particle, but, for example, may be 2 to 50, 2 to 40, 2 to 30, 2 to 20, 2 to 10, or 2 to 4 primary particles agglomerated to form a secondary particle.

The natural graphite may be flake graphite.

In one embodiment, the natural graphite may be flake graphite having a long axis and a short axis, and the length of the long axis may be about 5 μm to about 15 μm. When the long axis of natural graphite is within the above range, it may be randomly oriented, and the mobility of lithium ions may be increased to improve the rate characteristics. Furthermore, it may have a suitable edge portion, thereby appropriately or suitably maintaining efficiency.

In one embodiment, a ratio of the thickness of the amorphous carbon filled in the pores of the secondary particle to the thickness of the primary particles may be about 2.0 or less, or about 0.1 to about 2.0. Herein, the term "pores of the secondary particle" refers to a space between the primary particles (such as the space between flakes of natural graphite primary particles), and the thickness of the amorphous carbon filled in the pores of the secondary particle may refer to a distance between flakes of the natural graphite primary particles. When the ratio of the thickness of the amorphous carbon filled in the pores of the secondary particle to the thickness of the primary particles is 2.0 or less, the amount of the amorphous carbon filled in the pores of the secondary particle may be suitably controlled to further improve battery efficiency and to provide a higher pellet density in terms of electrochemical physical properties.

The thicknesses of the primary particles and the amorphous carbon may be measured from an SEM image of the active material, where the length of the short axis (among the lengths of the short axis and the long axis) corresponds to the thickness of the amorphous carbon, and the thickness of the primary particles corresponds to a thickness of the thinnest particle among the primary particles in the SEM image.

The amorphous carbon may be soft carbon.

In one embodiment, the negative active material may further include amorphous carbon positioned on the surface (e.g., outer surface) of the secondary particle. This is such that amorphous carbon may also be positioned on the surface of the secondary particle in the negative active materials. For example, the amorphous carbon may be filled in the pores of the negative active material, and (e.g., as well as) at least partially positioned on the surface of the secondary particle. When the amorphous carbon is positioned on the surface of the secondary particle, resistance may be reduced and low temperature characteristics may be improved.

When the amorphous carbon is positioned on the surface of the secondary particle, the thickness may be about 5 nm to about 50 nm, and according to embodiments, for example, may be about 10 nm to about 50 nm or about 20 nm to about 50 nm. When the thickness is within the range, side reaction(s) with the electrolyte may be further effectively suppressed, and/or battery charge and discharge rate characteristics may be improved.

Regardless of whether the amorphous carbon is only present in the pores of the negative active material or is both (e.g., simultaneously) in the pores and on the surface, the amount of the amorphous carbon may be about 1 wt % to about 9 wt % based on a total of 100 wt % of the negative active material. When the amount of the amorphous carbon is within the above range, the inner pores may be substantially or completely filled to further effectively suppress the expansion of the active material during charge and/or discharge, and the amorphous carbon may be included in the active material at a very sufficient amount to further improve rate characteristics.

The negative active material according to one embodiment may have a specific surface area of about 1 $m^2/g$ to about 3 $m^2/g$. The specific surface area may be a BET specific surface area measured by a Brunauer-Emmett-Teller (BET) method. The specific surface area of the negative active material within the above range is a lower value than the specific surface area of the general natural graphite (which is about 5 $m^2/g$), and the low specific surface area may allow further improved efficiency.

The negative active material according to one embodiment may be prepared by the following procedure.

Flake natural graphite with a particle diameter of about 70 μm or more may be pulverized and granulated to prepare fine (small particle) primary particles. The pulverization and small granulation may be performed by utilizing a pulverization device.

The prepared fine primary particles may have a particle diameter of about 5 μm to about 15 μm, for example, about 5 μm to about 13 μm, about 5 μm to about 12 μm, or about 5.5 μm to about 11.5 μm.

A spheroidization process may be performed by utilizing the fine primary particles and spheroidization equipment to agglomerate the prepared fine primary particles into a secondary particle. The spheroidization process may be performed by adding the primary particles to spheroidization equipment and rotating an inner container.

According to the spheroidization process, a secondary particle of agglomerated natural graphite primary particles and including pores may be prepared.

The prepared natural graphite secondary particle may be mixed with an amorphous carbon precursor to prepare a mixture.

The amorphous carbon precursor may not be particularly limited, as long as the material becomes a carbide (e.g., provides an amorphous carbon), but may be material with a softening point of about 200° C. to about 300° C. Non-limiting examples of the amorphous carbon precursor include synthetic pitch, petroleum-based pitch, and/or coal-based pitch.

As such, when the amorphous carbon precursor with the softening point of about 200° C. to about 300° C. is utilized as the amorphous carbon precursor, the inner pores of the secondary particle may be compactly filled due to a high residual carbon ratio, and the resulting low resistance may enable high rate characteristics.

The mixing process may be performed by mixing the natural graphite secondary particle and the amorphous carbon precursor at a weight ratio of about 95.5:4.5 to about 85:15 in order to provide natural graphite and amorphous carbon at a weight ratio of about 99:1 to about 91:9, e.g., about 99:1 to about 92:8, about 99:1 to about 93:7, or about 99:1 to about 94:6 by weight ratio in the final product.

When the natural graphite secondary particles and the amorphous carbon precursor are mixed at the weight ratio to provide natural graphite and amorphous carbon at the range in the final product, the amount of the amorphous carbon added to the inside of the secondary particle may be suitably controlled, and the pores inside of the secondary particle may be reduced to thereby decrease side reaction(s) between the electrolyte solution and/or to improve the degree of internal density. In the preparing the coating layer including amorphous carbon on the surface of the secondary particle, the coating layer with the above thickness range may be realized, and thus, structural stability of the natural graphite secondary particle may be obtained, expansion of the negative active material may be prevented or reduced, and cycle-life characteristics may be improved.

Thereafter, a pressure of the mixture may be controlled.

In one embodiment, the controlling the pressure may be performed utilizing a pressing procedure to exert a pressure to (on) the mixture, or utilizing a decompressing procedure by reducing a pressure. As such, when the controlling the pressure of the mixture is performed, the size of the pores formed inside of the secondary particle may be reduced and/or the amorphous carbon precursor may be readily filled in the pores.

In one embodiment, the controlling of the pressure may be performed utilizing a pressing procedure to the mixture to improve the inner density and/or a pellet density of a pellet, and as a result, the cycle-life characteristics and/or capacity may be increased.

The pressing procedure may involve adding (e.g., applying) a pressure of about 10 MPa to about 100 MPa. When the pressing procedure is performed under this pressure, the amorphous carbon precursor may be further well filled in the pores of the secondary particle, and the size of the pores may be more reduced. When the pressure of the pressing procedure is less than 10 MPa, the pores formed inside the secondary particle may not be suitably filled, and when the pressure is more than 100 MPa, the resulting product obtained therefrom may be unsuitably compact and/or hard.

When the product from the pressing procedure is unsuitably compact and/or hard, deagglomeration and removal of very small particles may be difficult to perform. Furthermore, even if the deagglomeration is performed, it may not be suitable in that the BET specific surface area may be extremely increased.

In some embodiments, the decompressing procedure may be reducing a pressure with (e.g., to) a pressure of about −0.1 MPa to about −1 MPa. When the decompressing procedure is performed under the pressure, the amorphous carbon precursor may be further well filled in the pores of the secondary particle, and the size of the pores may be further reduced. When the pressure of the decompressing procedure is less than −0.1 MPa, the pores of the secondary particle may not be effectively filled in the pores. In some embodiments, if the pressure is more than −1 MPa, the unsuitably compact and/or hard product may be prepared, and the decompressing procedure at lower than the above pressure may be practically difficult to perform. When the product from the decompressing procedure is extremely compact and/or hard, deagglomeration may be difficult to perform.

When the controlling of the pressure is performed before the mixing with the amorphous carbon precursor and natural graphite (e.g., the secondary particle), the effect of improving internal density by filling amorphous carbon in the pores may not be obtained. Without being bound by the correctness of any theory or explanation, it is thought that this is because the amorphous carbon precursor (for example, an amorphous carbon precursor) is impregnated inside the secondary particle, due to a capillary effect, at a higher temperature than the softening point of the pitch, and thus, if the secondary particle is not close (e.g., in close proximity with) to the amorphous carbon, pores at the interface of the two active materials may acts as a resistance, and a sufficient capillary effect may not be obtained.

After controlling the pressure, removal of very small particles to control (e.g., modify) a particle size distribution (PSD) may be further performed. Such controlling of the PSD may be performed by a sieving procedure (e.g., utilizing a sieve), and the procedure may provide a substantially uniform particle diameter of the final active material so that electrode uniformity may be secured during mixing of the negative active material composition, for example because a slurry of the negative active material composition can be evenly coated on a current collector.

Thereafter, the obtained product may be maintained at a temperature at which a viscosity of the amorphous carbon precursor is about 100 cP to about 1000 cP. In the process (e.g., during this act), the amorphous carbon precursor has fluidity, and when the viscosity is within the above range, the viscosity may be very low and the fluidity may be very good, and thus the amorphous carbon precursor filled in the pores of the secondary particle may be completely filled in the spaces of the pores, or for example, filling in the pores may effectively occur.

The temperature, at which a viscosity of the amorphous carbon precursor is about 100 cP to about 1000 cP, may be about 350° C. to about 400° C.

The maintaining may be performed for about 0.5 hours to about 4 hours. When the maintaining is performed within the above duration range, the occurrence of empty pores inside the secondary particle may be minimized or reduced.

Thereafter, the resulting material is disintegrated to prepare a disintegrated product. The disintegration may be performed for about 1 hour to about 2 hours.

The resulting product may be heat-treated to prepare a negative active material. The heat treatment may be performed at a temperature of about 950° C. to about 1400° C., for example about 1000° C. to about 1400° C. or about 1200° C. to about 1300° C. The heat treatment may be performed for about 1 hour to about 5 hours, for example, about 1 hour to about 4 hours, about 1 hour to about 3 hours, or about 2 hours to about 3 hours.

When the heat treatment is performed within the above temperature ranges and time ranges, the amorphous carbon precursor may be effectively filled in the pores inside the secondary particle.

According to the heat treatment, the amorphous carbon precursor may be converted to the amorphous carbon to be located inside the pores, or inside the pores and on the surface of the secondary particle.

Another embodiment provides a rechargeable lithium battery including a negative electrode including the negative active material, a positive electrode, and an electrolyte.

The negative electrode may include a current collector and a negative active material layer formed on the current collector.

In the negative active material layer, the negative active material may be included in an amount of 95 wt % to 99 wt % based on the total weight of the negative active material layer.

The negative electrode active material layer may include a binder, and may further optionally include a conductive material. In the negative active material layer, an amount of the binder may be about 1 wt % to about 5 wt % based on the total weight of the negative active material layer. When the negative active material layer further includes a conductive material, the negative active material layer includes about 90 wt % to about 98 wt % of the negative active material, about 1 wt % to about 5 wt % of the binder, and about 1 wt % to about 5 wt % of the conductive material.

The binder may facilitate adherence of the negative active material particles to each other and to the current collector. The binder may include a non-water-soluble binder, a water-soluble binder, or a combination thereof.

The non-water-soluble binder may be an ethylene propylene copolymer, polyacrylonitrile, polystyrene, polyvinyl chloride, carboxylated polyvinylchloride, polyvinyl fluoride, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, an acrylonitrile-butadiene rubber, an acryl rubber, a butyl rubber, a fluorine rubber, an ethylene oxide-including polymer, polyvinyl pyrrolidone, polyepichlorohydrin, polyphosphazene, ethylene propylene dieneco polymer, polyvinyl pyridine, chlorosulfonate polyethylene, latex, a polyester resin, an acryl resin, a phenol resin, an epoxy resin, polyvinyl alcohol, or a combination thereof.

When the water-soluble binder is utilized as a negative electrode binder, a cellulose-based compound may be further utilized to provide viscosity as a thickener. The cellulose-based compound includes one or more of carboxymethyl cellulose, hydroxypropyl methyl cellulose, methyl cellulose, or alkali metal salts thereof. The alkali metals may be Na, K, or Li. The thickener may be included in an amount of 0.1 parts by weight to 3 parts by weight based on 100 parts by weight of the negative active material.

The conductive material is included to provide electrode conductivity, and any electrically conductive material may be utilized as a conductive material unless it causes an unwanted chemical change. Non-limiting examples of the conductive material include a carbon-based material (such as natural graphite, artificial graphite, carbon black, acetylene black, ketjen black, denka black, a carbon fiber, and/or the like); a metal-based material of a metal powder and/or a metal fiber including copper, nickel, aluminum, silver, and/or the like; a conductive polymer (such as a polyphenylene derivative); or a mixture thereof.

The current collector may include one selected from a copper foil, a nickel foil, a stainless steel foil, a titanium foil, a nickel foam, a copper foam, a polymer substrate coated with a conductive metal, and a combination thereof, but is not limited thereto.

The positive electrode may include a positive current collector and a positive active material layer formed on the positive current collector. The positive active material may include compounds that reversibly intercalate and deintercalate lithium ions (lithiated intercalation compounds). For example, it may include one or more composite oxides of a metal selected from cobalt, manganese, nickel, and a combination thereof, and lithium. Non-limiting examples include compounds represented by the following chemical formulae. $Li_aA_{1-b}X_bD_2$ ($0.90 \le a \le 1.8$, $0 \le b \le 0.5$); $Li_aA_{1-b}X_bO_{2-c}D_c$ ($0.90 \le a \le 1.8$, $0 \le b \le 0.5$, $0 \le c \le 0.05$); $Li_aE_{1-b}X_bO_{2-c}D_c$ ($0.90 \le a \le 1.8$, $0 \le b \le 0.5$, $0 \le c \le 0.05$); $Li_aE_{2-b}X_bO_{4-c}D_c$ ($0.90 \le a \le 1.8$, $0 \le b \le 0.5$, $0 \le c \le 0.05$); $Li_aNi_{1-b-c}Co_bX_cD_\alpha$ ($0.90 \le a \le 1.8$, $0 \le b \le 0.5$, $0 \le c \le 0.5$, $0 \le \alpha \le 2$); $Li_aNi_{1-b-c}Co_bX_cO_{2-\alpha}T_\alpha$ ($0.90 \le a \le 1.8$, $0 \le b \le 0.5$, $0 \le c \le 0.5$, $0 \le \alpha < 2$); $Li_aNi_{1-b-c}Co_bX_cO_{2-\alpha}T_2$ ($0.90 \le a \le 1.8$, $0 \le b \le 0.5$, $0 \le c \le 0.5$, $0 \le \alpha < 2$); $Li_aNi_{1-b-c}Mn_bX_cD_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_\alpha$ ($0.90 \le a \le 1.8$, $0 \le b \le 0.5$, $0 \le c \le 0.5$, $0 \le \alpha \le 2$); $Li_aNi_{1-b-c}Mn_bX_cO_{2-\alpha}T_2$ ($0.90 \le a \le 1.8$, $0 \le b \le 0.5$, $0 \le c \le 0.5$, $0 \le \alpha \le 2$); $Li_aNi_bE_cG'_dO_2$ ($0.90 \le a \le 1.8$, $0 \le b \le 0.9$, $0 \le c \le 0.5$, $0.001 \le d \le 0.1$); $Li_aNi_bCo_cMn_dG'_eO_2$ ($0.90 \le a \le 1.8$, $0 \le b \le 0.9$, $0 \le c \le 0.5$, $0 \le d \le 0.5$, $0.001 \le e \le 0.1$); $Li_aNiG'_bO_2$ ($0.90 \le a \le 1.8$, $0.001 \le b \le 0.1$); $Li_aCoG'_bO_2$ ($0.90 \le a \le 1.8$, $0.001 \le b \le 0.1$); $Li_aMn_{1-b}G'_bO_2$ ($0.90 \le a \le 1.8$, $0.001 \le b \le 0.1$); $Li_aMn_2G'_bO_4$ ($0.90 \le a \le 1.8$, $0.001 \le b \le 0.1$); $Li_aMn_{1-g}G'_gPO_4$ ($0.90 \le a \le 1.8$, $0 \le g \le 0.5$); $QO_2$; $QS_2$; $LiQS_2$; $V_2O_5$; $LiV_2O_5$; $LiZO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $Li_aFePO_4$ ($0.90 \le a \le 1.8$).

In the chemical formulae, A is selected from nickel (Ni), cobalt (Co), manganese (Mn), and a combination thereof; X is selected from aluminum (Al), Ni, Co, Mn, chromium (Cr), iron (Fe), magnesium (Mg), strontium (Sr), vanadium (V), a rare earth element, and a combination thereof; D is selected from oxygen (O), fluorine (F), sulfur (S), phosphorus (P), and a combination thereof; E is selected from Co, Mn, and a combination thereof; T is selected from F, S, P, and a combination thereof; G' is selected from Al, Cr, Mn, Fe, Mg, lanthanum (La), cerium (Ce), Sr, V, and a combination thereof; Q is selected from titanium (Ti), molybdenum (Mo), Mn, and a combination thereof; Z is selected from Cr, V, Fe, scandium (Sc), yttrium (Y), and a combination thereof; and J is selected from V, Cr, Mn, Co, Ni, copper (Cu), and a combination thereof.

The compound(s) may have a coating layer on the surface, or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, potassium (K), sodium (Na), calcium (Ca), silicon (Si), Ti, V, tin (Sn), germanium (Ge), gallium (Ga), boron (B), arsenic (As), zirconium (Zr), or a mixture thereof. The coating layer may be disposed (e.g., applied) utilizing any method having no adverse influence on the properties of the positive active material. For example, the method may include any suitable coating method (such as spray coating, dipping, and/or the like) that is available in the related art.

In the positive electrode, an amount of the positive active material may be 90 wt % to 98 wt % based on the total weight of the positive active material layer.

In one embodiment, the positive active material layer may further include a binder and a conductive material. Herein, the amounts of the binder and the conductive material may each be about 1 wt % to about 5 wt % based on a total amount of the positive active material layer.

The binder may improve the binding properties of the positive active material particles with one another and with a current collector. Non-limiting examples of the binder include polyvinyl alcohol, carboxymethyl cellulose, hydroxypropyl cellulose, diacetyl cellulose, polyvinylchloride, carboxylated polyvinyl chloride, polyvinyl fluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material is included to provide electrode conductivity. Any suitable electrically conductive material may be utilized as a conductive material unless it causes an unwanted chemical change in a battery. Non-limiting examples of the conductive material include a carbon-based material (such as natural graphite, artificial graphite, carbon black, acetylene black, ketjen black, a carbon fiber, and/or the like); a metal-based material of a metal powder and/or a metal fiber including copper, nickel, aluminum, silver, and/or the like; a conductive polymer (such as a polyphenylene derivative); or a mixture thereof.

The current collector may be an aluminum foil, a nickel foil, or a combination thereof, but is not limited thereto.

The electrolyte may include a non-aqueous organic solvent and a lithium salt.

The non-aqueous organic solvent serves as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, t-butyl acetate, methyl propionate, ethyl propionate, propyl propionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like. The ketone-based solvent may include cyclohexanone and/or the like. The alcohol-based solvent may include ethanol, isopropyl alcohol, and/or the like, and the aprotic solvent may include nitriles such as R—CN (wherein R is a hydrocarbon group having a C2 to C20 linear, branched, or cyclic structure and may include a double bond, an aromatic ring, or an ether bond) and/or the like, dioxolanes (such as 1,3-dioxolane and/or the like), sulfolanes, and/or the like.

The non-aqueous organic solvent may be utilized alone or in a mixture. When the organic solvent is utilized in a mixture, the mixture ratio may be controlled in accordance with a desirable battery performance.

The carbonate-based solvent may include a mixture with a cyclic carbonate and a linear (chain) carbonate. The cyclic carbonate and linear carbonate may be mixed together in a volume ratio of 1:1 to 1:9, which may provide enhanced performance of an electrolyte.

The organic solvent may further include an aromatic hydrocarbon-based organic solvent in addition to the carbonate-based solvent. Herein, the carbonate-based solvent and the aromatic hydrocarbon-based organic solvent may be mixed in a volume ratio of 1:1 to 30:1.

The aromatic hydrocarbon-based organic solvent may be an aromatic hydrocarbon-based compound of Chemical Formula 1.

Chemical Formula 1

In Chemical Formula 1, $R_1$ to $R_6$ may be the same or different and may each independently be selected from hydrogen, a halogen, a C1 to C10 alkyl group, a haloalkyl group, and a combination thereof.

Non-limiting examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate and/or an ethylene carbonate-based compound represented by Chemical Formula 2 in order to improve battery cycle-life.

Chemical Formula 2

In Chemical Formula 2, $R_7$ and $R_8$ may be the same or different, and may each independently be selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not concurrently (e.g., simultaneously) hydrogen.

Non-limiting examples of the ethylene carbonate-based compound may be difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and/or the like. When such an additive for improving cycle-life is further utilized, the amount may be controlled within an appropriate or suitable range.

The lithium salt dissolved in an organic solvent supplies a battery with lithium ions, basically operates the rechargeable lithium battery, and improves transportation of the lithium ions between positive and negative electrodes. Non-limiting examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers, for example an integer of 1 to 20), LiCl, LiI, and/or $LiB(C_2O_4)_2$ (lithium bis(oxalato) borate; LiBOB). A concentration of the lithium salt may range from 0.1 M to 2.0 M. When the lithium salt is included at the above concentration range, an electrolyte may have excellent performance and/or lithium ion mobility due to optimal or suitable electrolyte conductivity and/or viscosity.

In some embodiments, a separator may be disposed between the positive electrode and the negative electrode depending on the format of the rechargeable lithium battery. Such a separator may include polyethylene, polypropylene, polyvinylidene fluoride, and multi-layers thereof (such as a polyethylene/polypropylene double-layered separator, a polyethylene/polypropylene/polyethylene triple-layered separator, or a polypropylene/polyethylene/polypropylene triple-layered separator).

Figure 1:
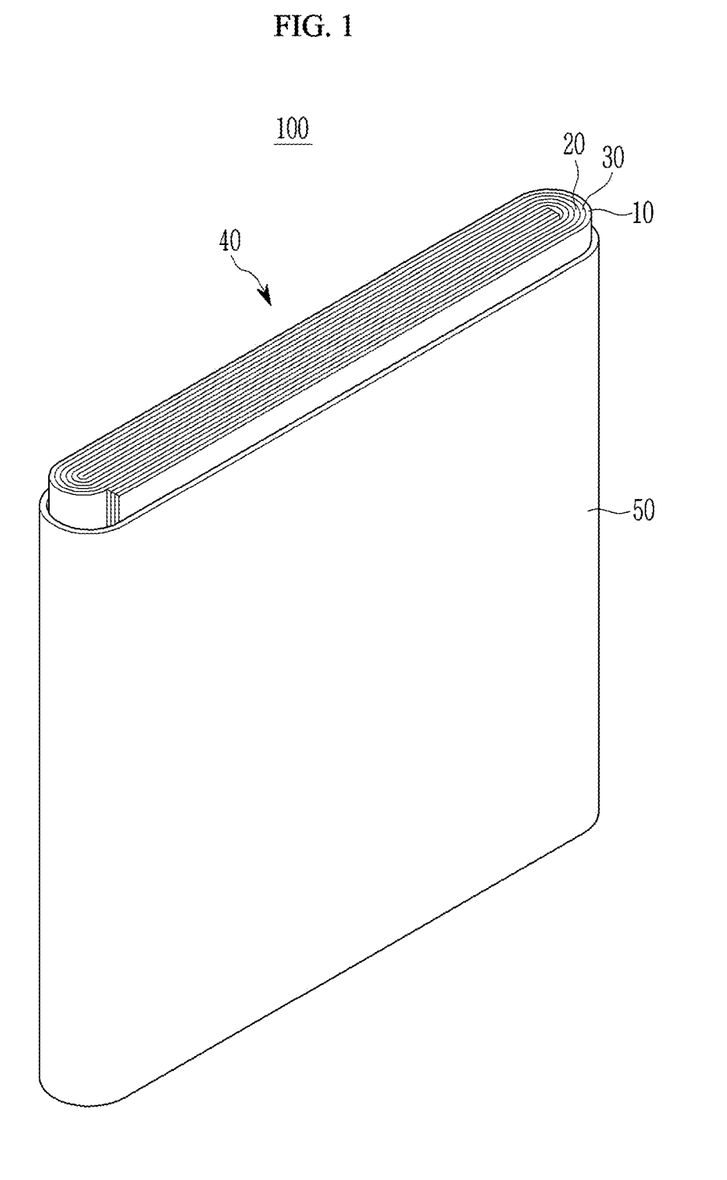
FIG. 1 is a drawing schematically showing a structure of the rechargeable lithium battery according to one embodiment.

FIG. 1 is an exploded perspective view of a rechargeable lithium battery according to an embodiment. The rechargeable lithium battery according to an embodiment is illustrated as a prismatic battery, but is not limited thereto and may include variously-shaped batteries (such as a cylindrical battery, a pouch format battery, and/or the like).

Referring to FIG. 1, a rechargeable lithium battery 100 according to an embodiment includes a wound electrode assembly 40 including a positive electrode 10, a negative electrode 20 and a separator 30 disposed therebetween, and a case 50 housing the electrode assembly 40. The positive electrode 10, the negative electrode 20, and the separator 30 may be impregnated with an electrolyte solution.

Hereinafter, examples of the present disclosure and comparative examples are described. However, the present disclosure is not limited to the examples.

Comparative Example 1

A fine primary particle with an average particle diameter D50 of 13 μm was prepared utilizing a pulverization device (product name; QWJ60) on flake natural graphite with an average particle diameter D50 of 70 μm. Using the fine primary particles and spheroidization equipment (product name: F500), secondary particles in which flake natural graphite primary particles were agglomerated and including pores were prepared.

The secondary particles were mixed with a petroleum pitch (product name: LQ250) as an amorphous carbon precursor at a weight ratio of 90:10 to prepare a mixture. A petroleum pitch amorphous carbon precursor with a softening point of 250° C. was utilized.

The mixture was heat-treated in a 1250° C. sintering furnace for 1.5 hours to prepare a negative active material including secondary particles with an average particle diameter D50 of 15 μm, in which the primary particles with the average particle diameter D50 of 13 μm were agglomerated. The secondary particles included pores, the soft carbon amorphous carbon was filled in the pores, and the negative active material had a specific surface area of 1.5 m²/g. Herein, the amount of amorphous carbon was 7 wt % based on a total weight of 100 wt % of the negative active material.

The negative active material of 97.5 wt %, carboxymethyl cellulose of 1.0 wt %, and styrene-butadiene rubber of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode and an electrolyte solution. 1 M $LiPF_6$ dissolved in a mixed solvent of ethylene carbonate and dimethyl carbonate (3:7 volume ratio) was utilized as the electrolyte solution.

Example 1

Fine primary particles with an average particle diameter D50 of 13 μm were prepared utilizing a pulverization device (product name; QWJ60) on flake natural graphite with an average particle diameter D50 of 70 μm. Using the fine primary particles and spheroidization equipment (product name: F500), secondary particles in which flake natural graphite primary particles were agglomerated and including pores were prepared.

The secondary particles were mixed with a petroleum pitch (product name: LQ250) amorphous carbon precursor at a weight ratio of 93:7 to prepare a mixture. As the LQ250 petroleum pitch amorphous carbon precursor, one with a softening point of 250° C. was utilized.

A pressing procedure by adding pressure of 30 MPa to the mixture was performed, and the resulting product was maintained at 360° C. for 1.5 hours in order to reach the viscosity of the LQ250 amorphous carbon precursor of 500 cP.

Thereafter, the resulting material was disintegrated for 1.5 hours, and the disintegrated product was heat-treated in a 1250° C. sintering furnace for 1.5 hours.

According to the procedure, a negative active material including secondary particles with an average particle diameter D50 of 15 μm, in which the primary particles with the average particle diameter D50 of 13 μm were agglomerated, was prepared. The secondary particles included pores, the soft carbon amorphous carbon was filled in the pores, and the negative active material had a specific surface area of 2.2 m²/g. Herein, the amount of amorphous carbon was 5 wt % based on a total weight of 100 wt % of the negative active material.

The negative active material of 97.5 wt %, carboxymethyl cellulose of 1.0 wt %, and styrene-butadiene rubber of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode, and an electrolyte solution. 1 M $LiPF_6$ dissolved in a mixed solvent of ethylene carbonate and dimethyl carbonate (3:7 volume ratio) was utilized as the electrolyte solution.

Example 2

Secondary particles in which flake natural graphite primary particles were agglomerated and including pores were prepared utilizing spheroidization equipment (product name: F500), and fine primary particles with an average particle diameter D50 of 13 μm, prepared by substantially the same procedure as in Example 1.

The secondary particles were mixed with a petroleum pitch (product name: LQ250) as an amorphous carbon precursor at a weight ratio of 90:10 to prepare a mixture. As the LQ250 petroleum pitch amorphous carbon precursor, one with a softening point of 250° C. was utilized.

A decompressing procedure by reducing a pressure of −0.5 MPa to the mixture was performed, and the resulting product was maintained at 360° C. for 1.5 hours in order to reach the viscosity of the petroleum pitch amorphous carbon precursor of 500 cP.

Thereafter, the resulting material was disintegrated for 1.5 hours, and the disintegrated product was heat-treated in a 1250° C. sintering furnace for 1.5 hours.

According to the procedure, a negative active material including secondary particles with an average particle diameter D50 of 15 μm, in which primary particles with the average particle diameter D50 of 13 μm were agglomerated, was prepared. The secondary particles included pores and the soft carbon amorphous carbon was filled in the pores, and the negative active material had a specific surface area of 1.77 $m^2/g$.

Herein, the amount of amorphous carbon was 7 wt % based on a total weight of 100 wt % of the negative active material.

The negative active material of 97.5 wt %, carboxymethyl cellulose of 1.0 wt %, and styrene-butadiene rubber of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode, and an electrolyte solution. As the electrolyte solution, 1 M $LiPF_6$ dissolved in a mixed solvent of ethylene carbonate and dimethyl carbonate (3:7 volume ratio) was utilized.

Example 3

A negative active material was prepared by substantially the same procedure as in Example 1, except that the secondary particles were mixed with the LQ250 amorphous carbon precursor at a weight ratio of 91.5:8.5 to prepare a mixture. The resulting negative active material included secondary particles with an average particle diameter D50 of 15 μm, in which primary particles with an average particle diameter D50 of 13 μm were agglomerated. The secondary particle included pores, the soft carbon was filled in the pores, and the negative active material had a specific surface area of 2.09 $m^2/g$. Herein, the amount of amorphous carbon was 6 wt % based on the total weight, 100 wt %, of the negative active material.

A negative electrode and a half-cell were fabricated from the negative active material, by substantially the same procedure as in Example 1.

Example 4

Fine primary particles with an average particle diameter D50 of 13 μm were prepared utilizing a pulverization device (product name; QWJ60) on flake natural graphite with an average particle diameter D50 of 70 μm. Using the fine primary particles and spheroidization equipment (product name: F500), secondary particles in which flake natural graphite primary particles were agglomerated and including pores were prepared.

The secondary particles were mixed with a petroleum pitch (product name: LQ250) amorphous carbon precursor at a weight ratio of 90:10 to prepare a mixture. As the LQ250 petroleum pitch amorphous carbon precursor, one with a softening point of 250° C. was utilized.

A pressing procedure by adding pressure of 30 MPa to the mixture was performed, and the resulting product was maintained at 360° C. for 1.5 hours in order to reach the viscosity of the LQ250 amorphous carbon precursor of 500 cP.

Thereafter, the resulting material was disintegrated for 1.5 hours, and the disintegrated product was heat-treated in a 1250° C. sintering furnace for 1.5 hours.

According to the procedure, a negative active material, including secondary particles with an average particle diameter D50 of 15 μm, in which the primary particles with the average particle diameter D50 of 13 μm were agglomerated, was prepared. The secondary particles included pores, the soft carbon amorphous carbon was filled in the pores, and the negative active material had a specific surface area of 1.92 $m^2/g$. Herein, the amount of amorphous carbon was 7 wt % based on a total weight of 100 wt % of the negative active material.

The negative active material in an amount of 97.5 wt %, carboxymethyl cellulose in an amount of 1.0 wt %, and styrene-butadiene rubber in an amount of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode, and an electrolyte solution. 1 M $LiPF_6$ dissolved in a mixed solvent of ethylene carbonate and dimethyl carbonate (3:7 volume ratio) was utilized as the electrolyte solution.

Example 5

A negative active material was prepared by substantially the same procedure as in Example 1, except that a sieving procedure for controlling the particle size distribution (PSD) by removing very small particles was further performed after the pressing procedure. The negative active material included secondary particles with an average particle diameter D50 of 15 μm, in which primary particles with an average particle diameter D50 of 13 μm were agglomerated. The secondary particles included pores, the soft carbon was filled in the pores, and the negative active material had a specific surface area of 1.82 $m^2/g$. Herein, the amount of amorphous carbon was 7 wt % based on a total weight of 100 wt % of the negative active material.

A negative electrode and a half-cell were fabricated from the negative active material by substantially the same procedure as in Example 2.

Comparative Example 2

A negative active material was prepared by substantially the same procedure as in Comparative Example 1, except that the secondary particles were mixed with the LQ250 amorphous carbon precursor at a weight ratio of 93:7 to prepare a mixture. The negative active material included secondary particles with an average particle diameter D50 of 15 μm, in which primary particles with an average particle diameter D50 of 13 μm were agglomerated. The secondary particle included pores, the soft carbon was filled in the pores, and the negative active material had a specific surface area of 1.63 m$^2$/g. Herein, the amount of amorphous carbon was 5 wt % based on a total weight of 100 wt % of the negative active material.

A negative electrode and a half-cell were fabricated from the negative active material by substantially the same procedure as in Example 1.

Comparative Example 3

Secondary particles in which flake natural graphite primary particles were agglomerated and including pores were prepared utilizing spheroidization equipment (product name: F500) and fine primary particles with an average particle diameter D50 of 13 μm, utilizing substantially the same procedure as in Example 1.

A pressing procedure by adding a pressure of 30 MPa to the secondary particles was performed.

Thereafter, the obtained secondary particle was mixed with a petroleum pitch (product name: LQ250) as an amorphous carbon precursor at a weight ratio of 90:10 to prepare a mixture. An LQ250 petroleum pitch amorphous carbon precursor with a softening point of 250° C. was utilized.

The resulting product was maintained at 360° C. for 1.5 hours in order to reach the viscosity of the LQ250 amorphous carbon precursor of 500 cP.

Thereafter, the resulting material was disintegrated for 1.5 hours, and the disintegrated product was heat-treated in a 1250° C. sintering furnace for 1.5 hours.

According to the procedure, a negative active material including secondary particles with an average particle diameter D50 of 15 μm, in which the primary particles with the average particle diameter D50 of 13 μm were agglomerated, was prepared. The secondary particles included pores, the soft carbon amorphous carbon was filled in the pores, and the negative active material had a specific surface area of 1.64 m$^2$/g. Herein, the amount of amorphous carbon was 7 wt % based on a total weight of 100 wt % of the negative active material.

The negative active material in an amount of 97.5 wt %, carboxymethyl cellulose in an amount of 1.0 wt %, and styrene-butadiene rubber in an amount of 1.5 wt % were mixed in distilled water to prepare a negative active material slurry composition.

The negative active material slurry composition was coated on a Cu current collector and dried, followed by compressing to prepare a negative electrode for a rechargeable lithium battery.

A half-cell was fabricated from the negative electrode, a lithium metal counter electrode, and an electrolyte solution. 1 M LiPF$_6$ dissolved in a mixed solvent of ethylene carbonate and dimethyl carbonate (3:7 volume ratio) was utilized as the electrolyte solution.

Comparative Example 4

A negative active material was prepared by substantially the same procedure as in Example 1, except that the secondary particles were mixed with the LQ250 amorphous carbon precursor at a weight ratio of 86:14 to prepare a mixture. The negative active material included secondary particles with an average particle diameter D50 of 15 μm, in which primary particles with an average particle diameter D50 of 13 μm were agglomerated. The secondary particles included pores, the soft carbon was filled in the pores, and the negative active material had a specific surface area of 1.80 m$^2$/g. Herein, the amount of amorphous carbon was 6 wt % based on a total weight of 100 wt % of the negative active material.

A negative electrode and a half-cell were fabricated from the negative active material, by substantially the same procedure as in Example 1.

Comparative Example 5

A negative active material was prepared by substantially the same procedure as in Comparative Example 2, except that the secondary particles were mixed with the LQ250 amorphous carbon precursor at a weight ratio of 83:17 to prepare a mixture. The negative active material included secondary particles with an average particle diameter D50 of 15 μm, in which primary particles with an average particle diameter D50 of 13 μm were agglomerated. The secondary particles included pores, the soft carbon was filled in the pores, and the negative active material had a specific surface area of 0.51 m$^2$/g. Herein, the amount of amorphous carbon was 12 wt % based on a total weight of 100 wt % of the negative active material.

A negative electrode and a half-cell were fabricated from the negative active material by substantially the same procedure as in Example 1.

Measurement of Pellet Density 1.0 g of each of negative active materials according to Examples 1 to 5 and Comparative Examples 1 to 5 was added to a mold and maintained under 2 tons of pressure (press force) for 30 seconds to prepare a pellet, and a pellet density of the pellet was measured. The results are shown in Table 1.

TABLE 1

| | BET specific surface area (m$^2$/g) | Pellet density (g/cc) |
| --- | --- | --- |
| Example 1 | 2.20 | 1.80 |
| Example 2 | 1.77 | 1.69 |
| Example 3 | 2.09 | 1.74 |
| Example 4 | 1.92 | 1.85 |
| Example 5 | 1.82 | 1.79 |
| Comparative Example 1 | 1.50 | 1.61 |
| Comparative Example 2 | 1.63 | 1.65 |
| Comparative Example 3 | 1.64 | 1.61 |
| Comparative Example 4 | 1.80 | 1.88 |
| Comparative Example 5 | 0.51 | 1.56 |

As shown in Table 1, the BET specific surface area of the negative active materials according to Examples 1 to 5 was increased compared to that of Comparative Examples 1 to 5. In particular, Comparative Example 5, which was produced without controlling the pressure and by utilizing excess amorphous carbon precursor exhibited a significantly reduced BET specific surface area of the active material of 0.51 m$^2$/g.

Measurement of Area Ratio, Length of Long Axis and Thickness Ratio

Figure 2:
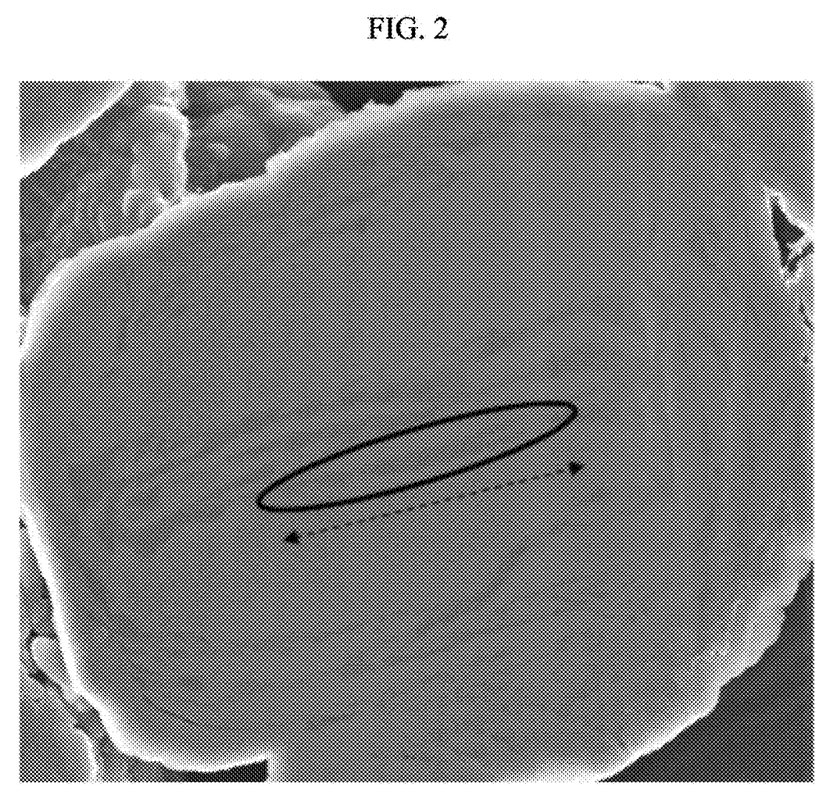
FIG. 2 is a SEM image of the negative active material according to Example 1.

In cross-sections of the negative active material according to Examples 1 to 5 and Comparative Examples 1 to 5, the area ratios were measured by taking a cross-section polished SEM image, that is, a SEM image for the cross-section of the negative active material, and classifying a dark region with a low value to be amorphous carbon and a bright region with a high value to be natural graphite, and measuring each area and the total area of the active material utilizing an Image J analysis tool. In the example of FIG. 2, which is a SEM image of the negative active material of Example 1, the dark region with the low value (e.g., within the black elliptical outline) is the amorphous carbon region, and an area thereof and a total area of the negative active material were measured.

The area percentage of the soft carbon (which was amorphous carbon) was obtained based on the measured total area of the negative active material for each of the Examples and Comparative Examples. The results are shown in Table 2.

In the SEM image, the length of the long axis of the primary particle was measured. The results are shown in Table 2. Herein, the length of the long axis corresponds to the dashed arrow shown in FIG. 2.

Evaluation of Cell Characteristics

The half-cells according to Examples 1 to 5 and Comparative Examples 1 to 5 were charged and discharged once at 0.2 C, and the charge capacity and the discharge capacity were measured. The discharge capacities are shown in Table 2.

The charge and discharge efficiency from the measured discharge capacity and charge capacity was obtained (percent value of discharge capacity/charge capacity). The results are shown in Table 2.

Furthermore, the half-cells according to Examples 1 to 6 and Comparative Examples 1 to 4 were charged and discharged at 0.2 C once and at 2 C once. The capacity ratio of the charge capacity at 2 C charge to the charge capacity at 0.2 C was obtained. The results are shown in Table 2 as "Rate characteristic" (e.g., rate capacity).

TABLE 2

| | Long axis length (μm) | Area ratio (%) | Amount of amorphous carbon (wt %) | Discharge capacity (mAh/g) | Initial efficiency (%) | Rate characteristic (2C/0.2C, %) |
|---|---|---|---|---|---|---|
| Example 1 | 13 | 15 | 5 | 367 | 93.7 | 35.7 |
| Example 2 | 13 | 15 | 7 | 358 | 90.6 | 39.7 |
| Example 3 | 13 | 19 | 6 | 363 | 92.2 | 38.8 |
| Example 4 | 13 | 25 | 7 | 356.7 | 91.5 | 41.8 |
| Example 5 | 13 | 25 | 7 | 357.2 | 91.8 | 41.1 |
| Comparative Example 1 | 13 | 9.8 | 7 | 354 | 91.7 | 32.9 |
| Comparative Example 2 | 13 | 5.5 | 5 | 359 | 92.4 | 30.8 |
| Comparative Example 3 | 13 | 9.1 | 7 | 357.5 | 91.9 | 33.2 |
| Comparative Example 4 | 13 | 35 | 10 | 351 | 89.1 | 45.5 |
| Comparative Example 5 | 13 | 40 | 12 | 350 | 87.8 | 45.8 |

As shown in Table 2, the cells utilizing the negative active materials according to Examples 1 to 5 each exhibited an initial efficiency of 91% or more, and a rate characteristic of 35% or more, which suitably satisfy the standard for substantial practical application of the initial efficiency of 91% or more and the rate characteristic of 35% or more.

Comparative Examples 1 to 3 each exhibited an initial efficiency of 91% or more, but a rate characteristic of less than 35%, and Comparative Examples 4 and 5 each exhibited a rate characteristic of 35% or more, but an initial efficiency of less than 91%. Thus, they did not satisfy the standard for substantial practical application which is the initial efficiency of 91% or more, and the rate characteristic of 35% or more.

Without being bound by the correctness of any theory or explanation, it is thought that these results are because the area of the amorphous carbon was within 10% to 30% based on a total area of 100% of the negative active material, and thus improvements in the internal density in the negative active materials according to Examples 1 to 5 occurred.

Measurement of Cell Expansion Ratio

The half-cells according to Examples 4 and 5 and Comparative Examples 1 and 2 were formation charged and discharged at 0.1 C once. The thickness before charging and discharging and the thickness after formation charging and discharging were measured. The thickness ratio (%) of the thickness after formation charging and discharging to that before charging and discharging was calculated. The results are shown in Table 3, as an expansion ratio.

The half-cells according to Example 4 and Comparative Examples 1 and 2 were fully charged at 0.2 C, and the thickness ratio (%) of the thickness after 0.2 C full-charging to the thickness before charging and discharging was measured. The results are shown in Table 3, as an expansion ratio.

Furthermore, half-cells according to Examples 4 and 5 and Comparative Examples 1 and 2 were charged and discharged at 1 C 50 times. The thicknesses of the cells before and after charge and discharge for 25 cycles were measured and the thicknesses of the cells before and after charge and discharge for 50 cycles were measured. The thickness ratios (%) were measured from the thickness after charging and discharging after 25 cycles to that before charging and discharging, and the thickness ratios (%) were measured from the thickness after charging and discharging after 50 cycles to that before charging and discharging, respectively. The results are shown in Table 3, as an expansion ratio.

TABLE 3

| | Formation charge and discharge expansion ratio (%) | 0.2C full-charge expansion ratio (%) | Expansion ratio after 25 cycles (%) | Expansion ratio after 50 cycles (%) |
|---|---|---|---|---|
| Comparative Example 1 | 15.1 | 17.6 | 7.4 | 10.0 |
| Comparative Example 2 | 15.3 | 17.7 | 7.9 | 12.3 |
| Example 4 | 15.2 | 15.6 | 6.9 | 9.4 |
| Example 5 | 14.2 | — | 6.5 | 8.9 |

As shown in Table 3, the thickness expansion ratios (e.g., expansion ratios after 25 cycles and expansion ratios after 50 cycles) of the cells according to Examples 4 and 5 are substantially smaller than that of Comparative Examples 1 and 2.

As used herein, the terms "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this present disclosure has been described in connection with what is presently considered to be practical example embodiments, it is to be understood that the present disclosure is not limited to the disclosed embodiments. On the contrary, it is intended to cover one or more suitable modifications and equivalent arrangements included within the spirit and scope of the appended claims and their equivalents.

What is claimed is:

1. A negative active material for a rechargeable lithium battery, the negative active material comprising:
    a secondary particle in which a plurality of primary particles are agglomerated, the plurality of primary particles comprising natural graphite, and the secondary particle comprising pores; and
    an amorphous carbon filled in the pores,
    wherein an area of the amorphous carbon is 10% to 30% based on a total area of 100% of the negative active material, in a cross-section through a center diameter of the secondary particle of the negative active material, and
    wherein the natural graphite is flake graphite.

2. The negative active material of claim 1, wherein each primary particle of the plurality of primary particles has a particle diameter of about 5 μm to about 15 μm.

3. The negative active material of claim 1, wherein the secondary particle has a particle diameter of about 8 μm to about 24 μm.

4. The negative active material of claim 1, wherein the natural graphite is flake graphite having a long axis and a short axis, and a length of the long axis is about 5 μm to about 15 μm.

5. The negative active material of claim 1, wherein the secondary particle further comprises the amorphous carbon on a surface of the secondary particle.

6. The negative active material of claim 1, wherein the negative active material comprises the amorphous carbon at an amount of about 1 wt % to about 9 wt % based on a total weight of 100 wt % of the negative active material.

7. A rechargeable lithium battery, comprising:
    a negative electrode comprising the negative active material of claim 1;
    a positive electrode comprising a positive active material; and
    an electrolyte between the negative electrode and the positive electrode.

* * * * *